US007440032B2

(12) United States Patent
Salzer et al.

(10) Patent No.: US 7,440,032 B2
(45) Date of Patent: Oct. 21, 2008

(54) BLOCK MODE ADAPTIVE MOTION COMPENSATION

(75) Inventors: Sven Salzer, Butzbach (DE); Frank Janssen, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 584 days.

(21) Appl. No.: 11/117,578

(22) Filed: Apr. 29, 2005

(65) Prior Publication Data

US 2005/0243216 A1 Nov. 3, 2005

(30) Foreign Application Priority Data

Apr. 30, 2004 (EP) ................... 04010295

(51) Int. Cl.
*H04N 7/01* (2006.01)
*H04N 11/20* (2006.01)

(52) U.S. Cl. ................ 348/452; 348/448; 348/458

(58) Field of Classification Search ........... 348/441, 348/451, 699–701, 452; 375/240.01, 240.02, 375/240.16

See application file for complete search history.

(56) References Cited

U.S. PATENT DOCUMENTS

| 5,241,382 | A | * | 8/1993 | Paik et al. ............. 375/240.25 |
| 5,355,169 | A | * | 10/1994 | Richards et al. ............. 348/459 |
| 5,428,399 | A | | 6/1995 | Robinson et al. |
| 5,508,747 | A | | 4/1996 | Lee |
| 5,610,662 | A | | 3/1997 | Hackett |
| 6,118,820 | A | * | 9/2000 | Reitmeier et al. ...... 375/240.16 |
| 6,385,245 | B1 | | 5/2002 | De Haan et al. |
| 2002/0131499 | A1 | | 9/2002 | De Haan et al. |

FOREIGN PATENT DOCUMENTS

| EP | 0514012 A2 | 11/1992 |
| EP | 0637889 A2 | 2/1995 |
| EP | 0675643 A1 | 10/1995 |
| WO | 99/16251 | 4/1999 |
| WO | 02/056597 | 7/2002 |

* cited by examiner

*Primary Examiner*—M. Lee
(74) *Attorney, Agent, or Firm*—Wenderoth, Lind & Ponack, L.L.P.

(57) ABSTRACT

The present invention relates to a motion compensated image process taking local characteristics of image data into account. Image data included in a single image may stem from different video sources. In order to take specific motion phase into account, the motion compensation process is switched accordingly such that an improved picture quality can be achieved.

22 Claims, 10 Drawing Sheets

| Memory F0 | Memory F1 | Memory F2 | Mode | Still | Phase | Interpolation frame 1 (new) | Interpolation frame 2 (old) | Comment |
|---|---|---|---|---|---|---|---|---|
| E0 | O1 | E2 | 0 | 0 | X | E0 | O1 | video / no pulldown (50 Hz / 60 Hz) |
| O1 | E2 | O3 | 0 | 0 | X | O1 | E2 | |
| E2 | O3 | E4 | 0 | 0 | X | E2 | O3 | |
| E0 | O0 | E1 | 1 | 0 | 0 | E0/O0 | E1 | 2-2 pulldown (50 Hz / 60 Hz) |
| O0 | E1 | O1 | 1 | 0 | 1 | O0 | E1/O1 | |
| E1 | O1 | E2 | 1 | 0 | 0 | E1/O1 | E2 | |
| O1 | E2 | O2 | 1 | 0 | 1 | O1 | E2/O2 | |
| E0 | O0 | E1 | 1 | 0 | 2 | E0/O0 | E0/O0 | 3-2 pulldown (60 Hz) |
| O0 | E1 | O1 | 1 | 0 | 3 | E0/O0 | O1 | |
| E1 | O1 | E2 | 1 | 0 | 4 | E1 | E1/O1 | |
| O1 | E2 | O2 | 1 | 0 | 5 | E1/O1 | O2 | |
| E2 | O2 | E2 | 1 | 0 | 6 | E2/O2 | E2/O2 | |
| E0 | O1 | E2 | 0 | 1 | 0 | E0/O1 | E0/O1 | video still (50 Hz / 60 Hz) |
| O1 | E2 | O3 | 0 | 1 | 1 | E2/O1 | E2/O1 | |
| E2 | O3 | E4 | 0 | 1 | 0 | E2/O3 | E2/O3 | |
| E0 | O0 | E1 | 1 | 1 | 0 | E0/O0 | E0/O0 | 2-2 pulldown still (50 Hz / 60 Hz) |
| O0 | E1 | O1 | 1 | 1 | 1 | E1/O1 | E1/O1 | |
| E1 | O1 | E2 | 1 | 1 | 0 | E1/O1 | E1/O1 | |
| O1 | E2 | O2 | 1 | 1 | 1 | E2/O2 | E2/O2 | |
| E0 | O0 | E1 | 1 | 1 | 2 | E0/O0 | E0/O0 | 3-2 pulldown still (60 Hz) |
| O0 | E1 | O1 | 1 | 1 | 3 | E0/O0 | E0/O0 | |
| E1 | O1 | E2 | 1 | 1 | 4 | E1/O1 | E1/O1 | |
| O1 | E2 | O2 | 1 | 1 | 5 | E1/O1 | E1/O1 | |
| E2 | O2 | E2 | 1 | 1 | 6 | E2/O2 | E2/O2 | |
| O2 | E2 | O2 | 1 | 1 | 2 | E2/O2 | E2/O2 | |

BLOCK MODE ADAPTIVE MOTION COMPENSATION

BACKGROUND OF THE INVENTION

1. Field of the Invention

The present invention relates to improved generation of motion compensated images. In particular, the present invention relates to a method for generating motion compensated output image data based on an interlaced input video sequence of subsequent fields and a corresponding motion compensator.

2. Description of the Related Art

The present invention is employed in picture improvement algorithms which are used, in particular, in digital signal processing of modern television receivers. Specifically, modern television receivers perform a frame-rate conversion, especially in a form of an up-conversion using frame repetition or a motion compensated up-conversion, for increasing the picture quality of the reproduced images. Motion compensated up-conversion is performed, for instance, for video sequences having a field or frame frequency of 50 Hz to higher frequencies like 60 Hz, 66.67 Hz, 75 Hz, 100 Hz, etc. While the 50 Hz input signal frequency mainly applies to a television signal broadcast based on the PAL or SECAM standard, NTSC based video signals have an input frequency of 60 Hz. A 60 Hz input video signal may be up-converted to higher frequencies like 72 Hz, 80 Hz, 90 Hz, etc.

During up-conversion, intermediate images are to be generated which reflect the video content at positions in time which are not represented by the 50 Hz or 60 Hz input video sequence. For this purpose, the motion of objects has to be taken into account in order to appropriately reflect the changes between subsequent images caused by the motion of objects. The motion of objects is calculated on a block basis, and motion compensation is performed based on the relative temporal position of the newly generated image between the previous and subsequent image.

For a motion vector determination and compensation, each image is divided into a plurality of blocks. Each block is subjected to motion estimation in order to detect a shift of an object from the previous image.

In contrast to interlaced video signals like PAL or NTSC signals, motion picture data is composed of complete frames. The most widespread frame rate of motion picture data is 24 Hz (24p). When converting motion picture data for display on a television receiver (this conversion is called telecine), the 24 Hz frame rate is converted into an interlaced video sequence by employing a "pull down" technique.

For converting motion picture film into an interlaced signal conforming to the PAL standard, having a field rate of 50 Hz (50i), a 2-2 pull down technique is employed. The 2-2 pull down technique generates two fields out of each film frame, while the motion picture film is played at 25 frames per second (25p). Consequently, two succeeding fields contain information originating from the same frame and representing the identical temporal position of the video content, in particular of moving objects.

When converting motion picture film into an interlaced signal conforming to the NTSC standard, having a field rate of 60 Hz (60i), the frame rate of 24 Hz is converted into a 60 Hz field rate employing a 3-2 pull down technique. This 3-2 pull down technique generates two video fields from a given motion picture frame and three video fields from the next motion picture frame.

Figure 1:
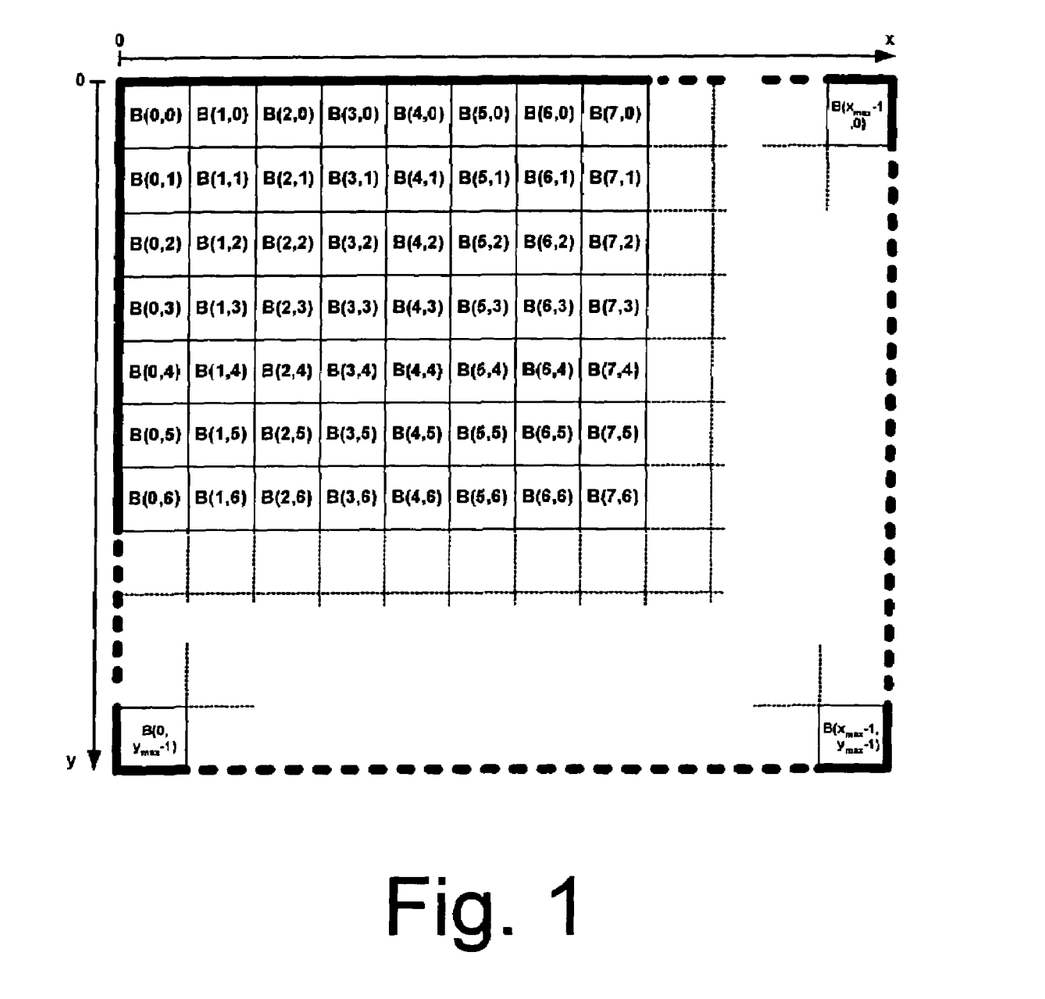
FIG. 1 illustrates division of a video image into a plurality of blocks of a uniform size.
Figure 2:
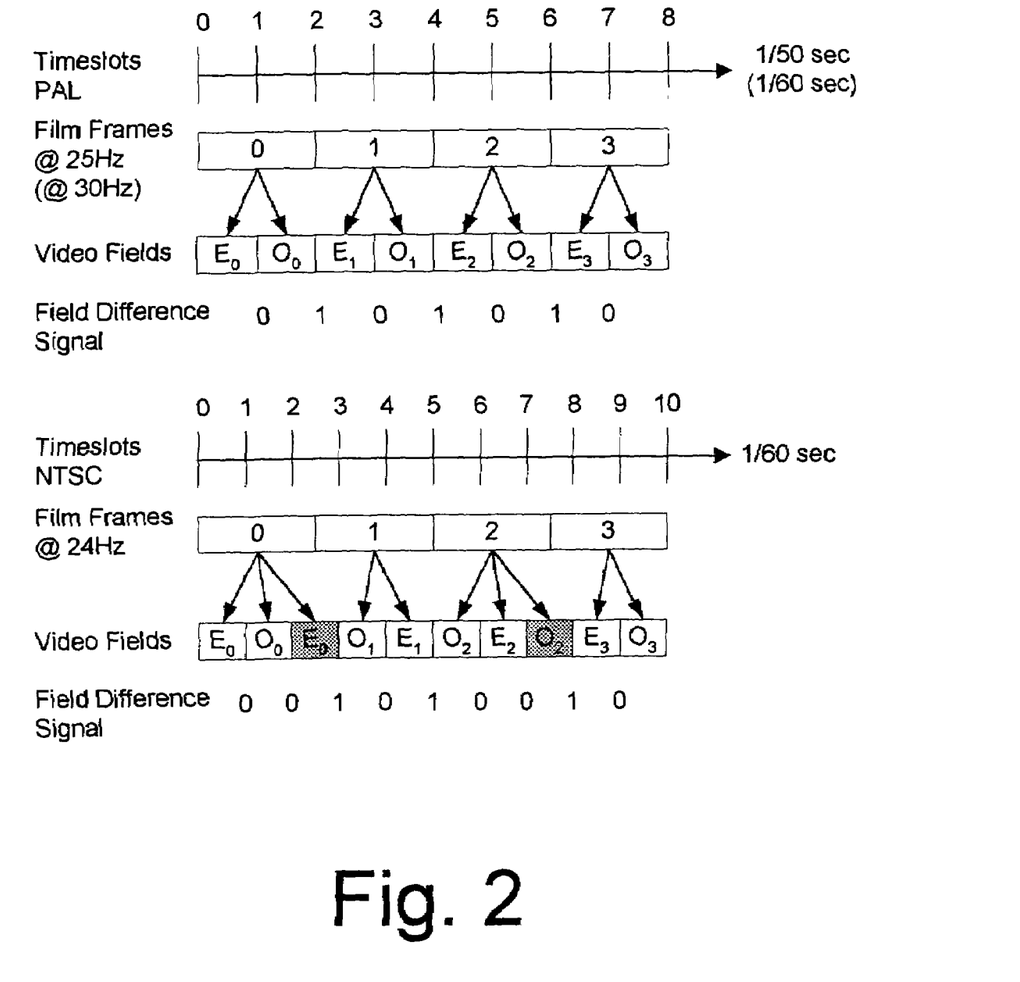
FIG. 2 illustrates the conversion of motion picture images into an interlaced sequence of images in accordance with the PAL and NTSC television broadcast standard.

The telecine conversion process for generating interlaced video sequences in accordance with different television standards is illustrated in FIG. 2. The employed pull down techniques result in video sequences which include pairs or triplets of adjacent fields reflecting an identical motion phase. A field difference for distinguishing a telecine signal from an interlaced image sequence, can only be calculated between fields which stem from different film frames.

For picture improvement processing, the temporal position reflected by each field in a sequence of interlaced video images does not need to be taken into account if the image content does not include moving objects. However, if moving objects are present in the fields to be processed, the individual motion phase of each field needs to be taken into account. Thus, picture improvement processing requires information indicating the motion characteristic of the individual fields, i.e. whether each field reflects an individual motion phase or whether a pull down technique has been employed, such that subsequent fields reflect identical motion phases.

In accordance with the different types of input image data, motion compensated de-interlacing processing is controlled in order to achieve the best picture quality of the output image data. For this purpose EP-A-0 740 467 and U.S. Pat. No. 6,222,589 describe a recombination of source fields which belong to the same film frame and a repeated output of the same frame with the desired output frame rate. In this manner, a high spatial resolution can be achieved. U.S. Pat. No. 5,495,300 describes an algorithm to double the motion phase from 25 to 50 per second in a 100 Hz television system. Motion vectors are estimated and employed between fields of different motion phases only. EP-A-0675 643 describes a two step picture improvement processing. In the first step, two fields of the same film frame are combined into an interlaced-to-progressive converter. The second step includes vector-based interpolation to generate motion compensated output images in between. For instance, a 50 Hz to 100 Hz conversion output sequence of four fields consists of an original input field and three interpolated output fields.

In order to accurately switch the motion compensation algorithms for film mode and video mode processing, a film mode detection is required. Film mode detection determines the current mode of the input image sequence based on global field differences. A known method is described in EP-A-1 198 137.

The present invention aims to further improve motion compensated image processing and to provide an improved method for generating motion compensated output image data and an improved motion compensator.

This is achieved by the features of the independent claims.

SUMMARY OF THE INVENTION

According to a first aspect of the present invention, a method for generating motion compensated output image data based on an interlaced input of a video sequence of subsequent fields is provided. Each field of the interlaced video sequence comprises a plurality of image areas wherein a motion vector and status information is provided for each of the image areas. A motion vector and status information is received for a current image area of the output image to be generated. Input image data of the input video sequence is obtained based on the received motion vector and the received status information. The output image data for the current output image area is generated based on the obtained input image data.

According to a further aspect of the present invention, a motion compensator for generating motion compensated output image data based on an interlaced video sequence of subsequent fields is provided. Each field of the interlaced input video sequence comprises a plurality of image areas. A motion vector and status information is provided for each of the image areas. The motion compensator comprises an input memory and an output interpolator. The input memory stores video data of image areas of the input video sequence in accordance with a motion vector and status information received for a current image area of the output image to be generated. The output interpolator generates output image data from the video data stored in the input memory.

It is the particular approach of the present invention to perform motion compensation based on local characteristics of the input image sequence. The status information is obtained for each of a plurality of image areas of an input image. The generation of output image data is performed in accordance with the status information on an image area basis.

It is a particular advantage of the present invention that mixed mode image sequences which consist of different types of image data can be processed appropriately while prior art approaches only take global status information relating to an entire input image into account. Image objects stemming from different image sources can be processed appropriately in accordance with the present invention. Image artifacts generated in the output image sequence are efficiently prevented and enhanced picture quality can be achieved.

Preferably, the status information indicates whether an image area is in film mode or video mode. Based thereon, a picture improvement processing can be switched accordingly in order to take the motion between subsequent image areas appropriately into account.

Preferably, the status information includes a motion phase indication for film mode image areas. Accordingly, the individual motion phases of the image areas can be accurately determined and employed for adjusting the motion compensation processing.

Preferably, the status information indicates whether an image area is in still mode or motion mode. In accordance therewith, the picture improvement processing can reliably decide whether or not a de-interlacing of image areas stemming from subsequent fields is to be performed.

According to a preferred embodiment, input image areas stemming from two different motion phases are selected for generating the output image data. Accordingly, a motion phase at intermediate temporal positions can be reliably generated on an image area basis.

Preferably, an input image memory stores image areas of at least three subsequent fields for generating the output image data. In this manner, output image data of high picture quality is achievable by only employing a minimum hardware effort and a minimum amount of required memory capacity.

Preferably, the data of two image areas stemming from two fields which represent a single motion phase are de-interlaced into a progressive video format. In this manner, only a single progressive source image area is required in order to achieve output image data of increased resolution. The motion position of moving objects is adjusted by motion compensation in accordance with the video information available from another image area representing a different motion phase.

Preferably, those image areas belonging to a single motion phase are selected in accordance with the motion phase indication of the status information.

Preferably, the image data stemming from a single motion phase, i.e. an image area of a single image or a de-interlaced image area, are subjected to interpolation in order to generate interpolated output pixel data to be combined with respective interpolated image data of another image area.

For video mode image areas, only two input image areas are selected for generating the output image area.

Preferably, the motion vector and status information, on which the motion compensated image processing of a current output image area is based, is obtained from the status information and motion vector of an image area at a corresponding position in an input video image wherein the input video image is in temporal proximity to the output image to be generated. In this manner, the local image characteristics can be taken into account during motion compensation in a simple and efficient manner.

Preferred embodiments of the present invention are subject matter of the dependent claims.

BRIEF DESCRIPTION OF THE DRAWINGS

Other embodiments and advantages of the present invention will become more apparent from the following description of preferred embodiments, in which.

DETAILED DESCRIPTION OF THE INVENTION

The present invention relates to digital signal processing, especially to signal processing in modern television receivers. Modern television receivers employ up-conversion algorithms in order to increase the reproduced picture quality and increase the display frequency. For this purpose, intermediate images are to be generated from two subsequent images. For generating an intermediate image, the motion of objects has to be taken into account in order to appropriately adapt the object position to the point of time reflected by the compensated image.

The present invention is preferably used in display units or image enhancer devices. Video signal processing is inherently necessary to drive progressive displays in order to avoid interlaced line flicker and to reduce large area flicker by employing higher frame rates. Further, the resolution is enhanced for SD (Standard Definition) signals for display on HDTV display devices.

The detection of motion picture film, which was subjected to a telecine process (further referred to as film-mode), is required for picture improvement processing. For instance, an image enhancement may be achieved by interlaced/progressive conversion (I/P). For this purpose, an inverse telecine process is performed by re-interleaving even and odd fields. In case of a 3-2 pull down conversion (as illustrated in the bottom example of FIG. 2), the single redundant field can be eliminated. The redundant repetition of a video field during 3-2 pull down conversion is marked by the grey coloured fields in FIG. 2.

More advanced up-conversion algorithms employ motion estimation and vector interpolation. The output frame rate may be an uneven fraction of the input frame rate. For instance an up-conversion from 60 Hz to 72 Hz corresponds to a ratio of 5 to 6. During such a conversion, only every $6^{th}$ output frame can be generated from a single input field, when generating a continuous impression of the motion of a moving object.

Figure 3:
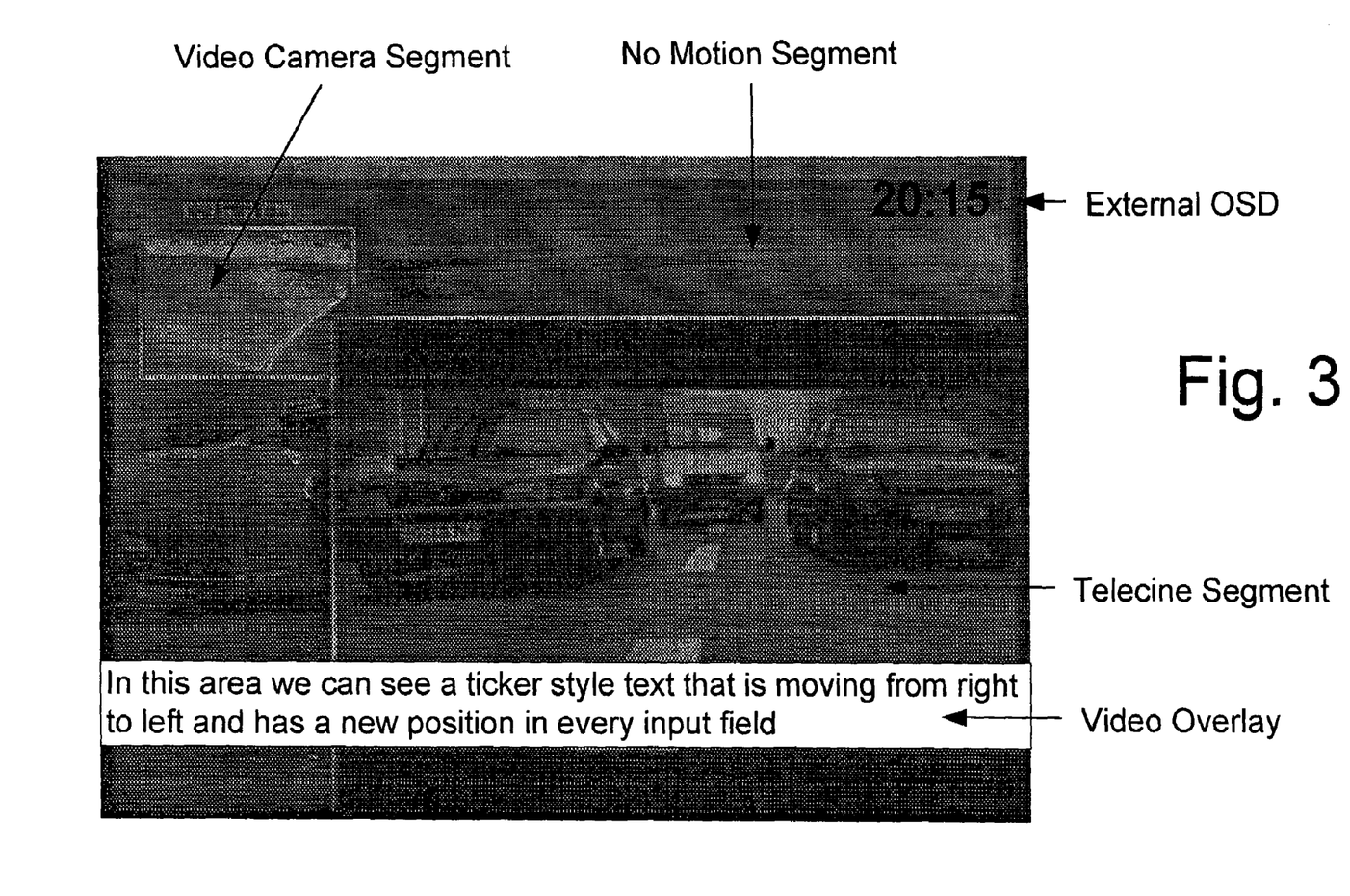
FIG. 3 illustrates an example of a mixed mode video image including image portions from multiple sources.

While prior art film mode detectors only evaluate an entire image for film mode detection, the film mode characteristic might, however, differ for different portions within the image. In particular, mixed mode images are composed from video sources providing different types of image data. These mixed mode sequences mainly consist of three types of image content: still or constant areas (e.g. logo, background, OSD), video camera areas (e.g. news ticker, video inserts/overlay), and film mode areas (e.g. main movie, PIP). In particular, new encoding schemes such as MPEG-4 allow a combination of image data originating from different sources within a single re-assembled image as shown, for instance, in FIG. 3 in a simple manner. Thus, a single field may comprise data originating from motion picture film, from a video camera source and/or from computer generated scenes.

Conventional film mode detectors always detect the "predominant mode" covering only the mode present for the biggest part of the image. Such conventional detectors may cause errors in the reproduced image, as a motion compensator does not take the characteristics of smaller image portions into account. Consequently, a reverse telecine processing applied to a complete image will cause artifacts in those image areas which do not stem from motion picture film.

Further, a single image may contain image portions originating from a 2-2 pull down of a 30 Hz computer animation and, in addition, a 3-2 pull down segment. If two different types of film mode occur in a single image, the respective image portions have to be processed differently during image improvement processing.

A different processing is also required when image portions stemming from a regular 2-2 pull down and other image portions stemming from an inverse 2-2 pull down are present in the same image, wherein the inverse 2-2 pull down images have an inverse order of the odd and even fields.

It is the particular approach of the present invention to divide each image into a plurality of blocks and to perform motion compensation on a block basis. Thus, the characteristics of a video sequence are determined on a block basis and a picture improvement processing based thereon provides an improved picture quality.

In accordance with the obtained local image characteristics, motion compensation and de-interlacing can be individually performed for each image area preferably on a block basis. Preferably, a self-adaptive combination of video mode and film mode processing in different parts of a single picture achieves the best picture quality during picture improvement processing for image sequences of a mixed mode image content.

High quality film-to-video conversion requires smooth motion reproduction as well as high spatial resolution. For this purpose, the present invention preferably combines a three-field motion compensated frame rate conversion of film mode image content and a two-field frame rate conversion of video mode image content. Both algorithms are switched on a block basis in accordance with control signals stemming from a block based film/still detector. During film mode compensation, different input block lines from two input fields belonging to the same input film frame are re-interleaved in order to preserve the vertical resolution of the original film frame. Such a re-interleaved block is interpolated together with the remaining third input field.

The present invention is implemented by employing a block line switch unit for merging the input lines of two successive input fields if these belong to the same film frame or in case of still mode, i.e. the detection of no-motion. The block switch unit is controlled by several status signals indicating film/video mode, still/motion mode provided by a film/still detector.

The existing television broadcast standards PAL and NTSC are based on a different field rate of 50 Hz and 60 Hz. A 50 Hz system produces large area flicker, especially when producing the transmitted images on large display devices. The 50 Hz and the 60 Hz system produce a line flicker due to the interlaced transmission standard. The line flicker results from the alternate transmission of odd and even lines in subsequent fields.

Figure 4:
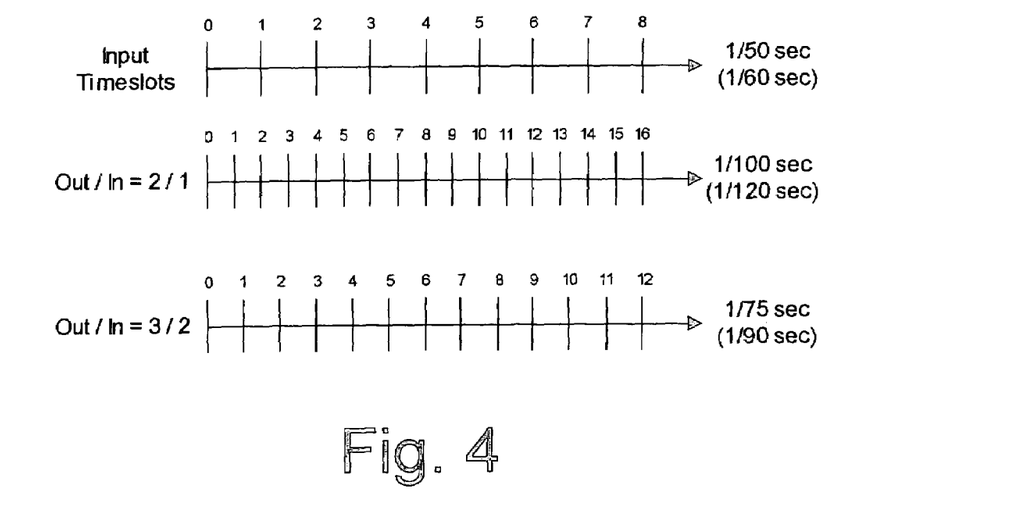
FIG. 4 illustrates the relation of input and output images for different up-conversion rates.

In order to overcome this disadvantage, a television receiver increases the display frequency, for instance to 100 Hz, and/or uses a progressive representation of the images. Such a conversion of the display frequency requires the calculation of additional intermediate images as illustrated in FIG. 4.

The high quality up-conversion of an interlaced input video sequence requires the reliable detection of motion vectors. The motion vectors represent the motion value in a direction of blocks or image objects in the input image sequence.

During motion compensation, two images are shifted based on a single motion vector. The previous input image is shifted forward with a positive direction of the motion vector, and each successive image is shifted backwards with a complementary negative direction of the motion vector. These fractions depend on the temporal position of the output image with respect to the input image.

Figure 5:
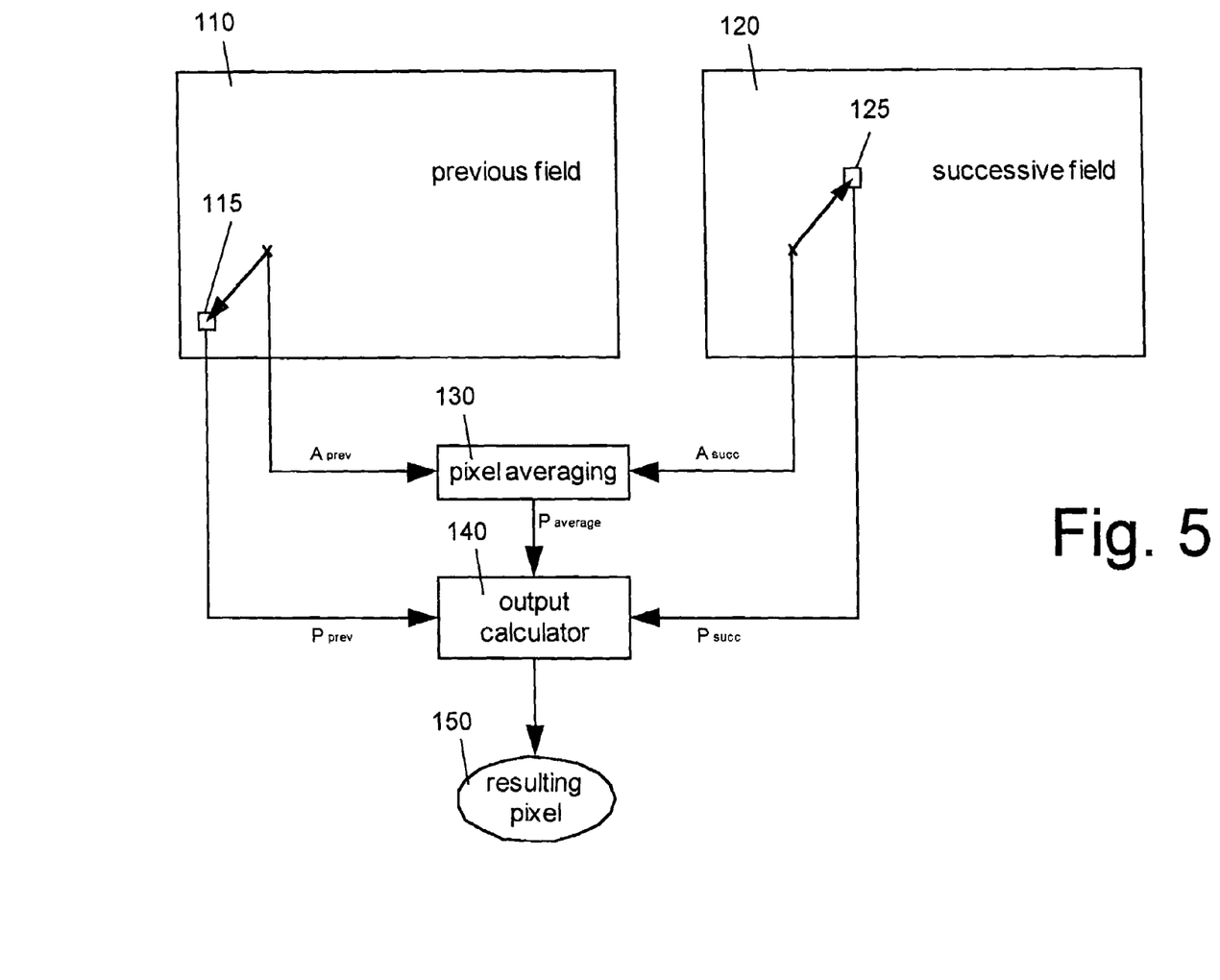
FIG. 5 illustrates an example configuration of a motion compensator.

Pixel values from these two interpolated images and, in addition, an average pixel from the original position of the previous and successive images are processed as illustrated in FIG. 5 in order to calculate a respective output pixel. Specifically, image area 115, 125 from two subsequent input images 110, 120 are employed. The position of the image areas 115, 125 is selected in accordance with the motion vector to be used for generating a current output image area. In addition to the image data from image area 115, 125, an additional average pixel $P_{average}$ is calculated in pixel averaging unit 130. Based on the pixel data of the previous image $P_{prev}$, the successive image $P_{succ}$ and the average pixel $P_{average}$, a resulting output pixel 150 is calculated by output calculator 140.

Figure 8:
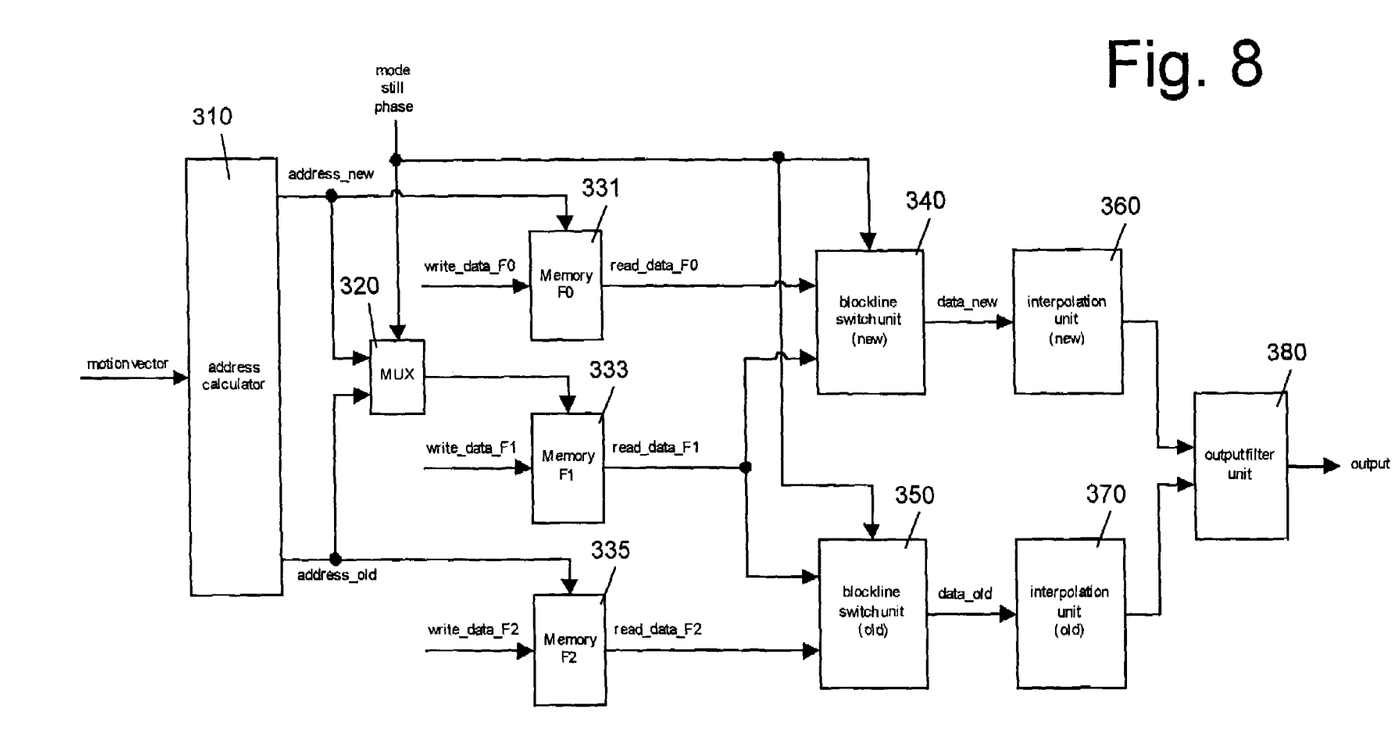
FIG. 8 illustrates an example configuration of a motion compensator in accordance with the present invention.

In order to meet the demands of picture quality and of a reasonable cost limitation, three input fields are stored in an input image memory. As illustrated in the configuration of FIG. 8, preferably, only those image areas stemming from three subsequent input fields are read out which are required for the generation of the current output image area. These memories are denoted by reference numerals 331, 333, and 335 in FIG. 8. The image data read out thereof is selected in accordance with the motion vector of the current output image area.

The present invention uses de-interlaced input image data in order to achieve motion compensated image data of high picture quality. For this purpose, the image data from two input fields are preferably provided in progressive video format in order to generate output image data of increased resolution. The image data from two image input fields are merged in block line switch units (new, out) 340, 350, respectively. The block line switch units 340, 350 only generate a progressive image area if a de-interlacing is possible in accordance with the respective status information, i.e. film mode, still mode, motion phase.

Figure 6:
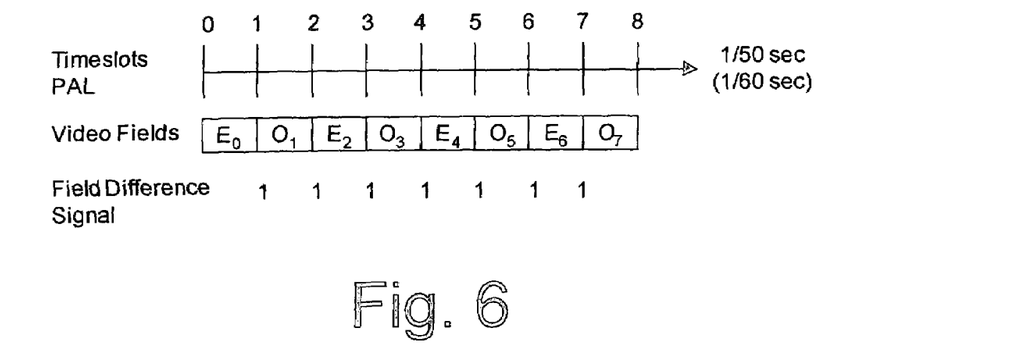
FIG. 6 illustrates the motion between images in a video image input sequence.

For high quality de-interlacing processing, the motion compensator has to distinguish between film mode and video mode image content. For video mode image content, there is motion between the image areas of each input field and the field difference signal between these respective image areas is set to "1" as illustrated in FIG. 6. For such video mode image content, the motion compensation algorithm only employs image data from the two latest fields stored in memories 331, 333 (F0, F1).

For film mode image content, the motion phases are taken into account during motion compensation in order to only de-interlace those image data stemming from fields of the identical motion phase. When processing film mode image data, all three image areas (F0, F1, F2) stored in memories 331, 333, 335 are employed wherein those image areas subjected to de-interlacing are determined in accordance with the respective motion pattern.

The processing of the motion compensator illustrated in FIG. 8 is based on the indication of the image type on a block basis. The signal "mode" indicates video mode by a "0" and film mode by a "1". In case of film mode, it is necessary to decide which of the image areas of input fields correspond to the same film frame. This information is provided by the motion phase signal "phase" representing values from 0 to 6. The two possible motion phases of a 2-2 pull down scheme are reflected by the values of 0 and 1. The five possible motion phases of a 3-2 pull down scheme are preferably marked by values between 2 and 6. The value 2 has a special meaning. This value indicates the state of three input fields originating from the same film frame in a 3-2 pull down scheme. Accordingly, there is no motion available between all of the fields. Thus, a special processing is required.

The combination, i.e. de-interlacing, of film mode fields of the same film frame preserves the original vertical resolution and improves the output interpolation picture quality.

The control signals "mode" and "phase" are preferably provided by a block mode detection unit (not shown in the drawings). These control signals indicate for each image block whether its image content is in video mode or in film mode and which motion phase applies to a film mode block.

Additionally, a motion detection is performed on a block basis indicating whether an image block has a moving or a still content. This is indicated by the still mode signal (e.g. "0": motion, "1": still). In case of a still mode input image block, the image data from image areas of two successive fields are always merged into a progressive video format, irrespective of the film mode or video mode indication.

Figure 7:
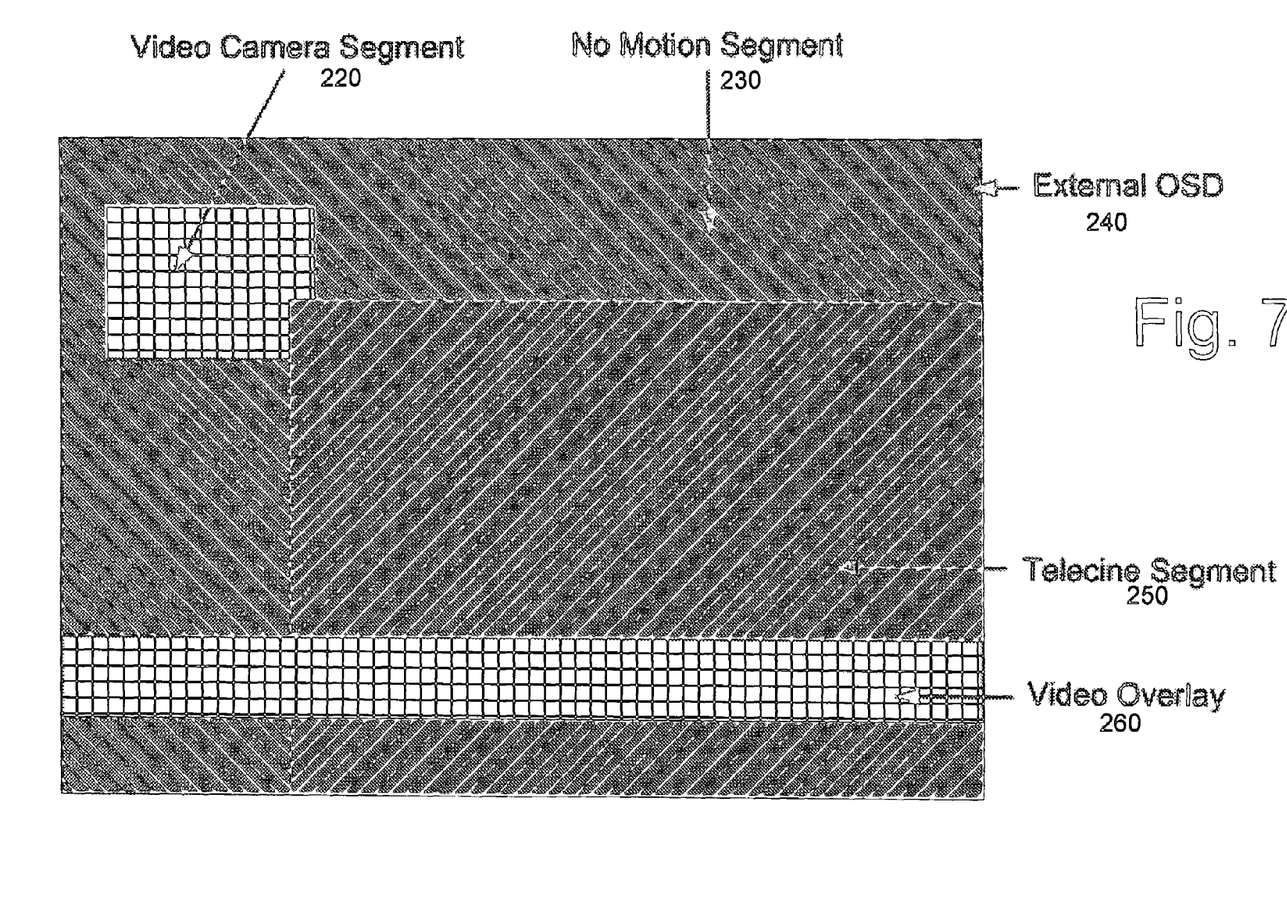
FIG. 7 illustrates an example detection result of status information for the input video image of FIG. 3.

An example of mode detections for a current video image on a block basis is illustrated in FIG. 7. As can be seen therefrom, the image includes a no-motion segment 230, i.e. a still mode segment, a video mode segment 220 and a telecine segment 250, i.e. a film mode segment. Overlaid thereon is a ticker area 260 in video mode. The OSD image portion 240 is part of the no-motion image segment 230.

Depending on the values of the film/video mode, motion phase and still mode indications, the image data of two successive fields are merged into a de-interlaced progressive image area (old) by a block line switch unit 350. The remaining image data F0 of the third input field is employed as a second interpolation image area (new). All three indications, i.e. mode, still and phase, are provided to the block line switch units 340, 350 and to a multiplexer 320. The multiplexer selects the image position of field F1 in the input image sequence in accordance with the motion vector, the mode and the motion phase.

Figure 9:
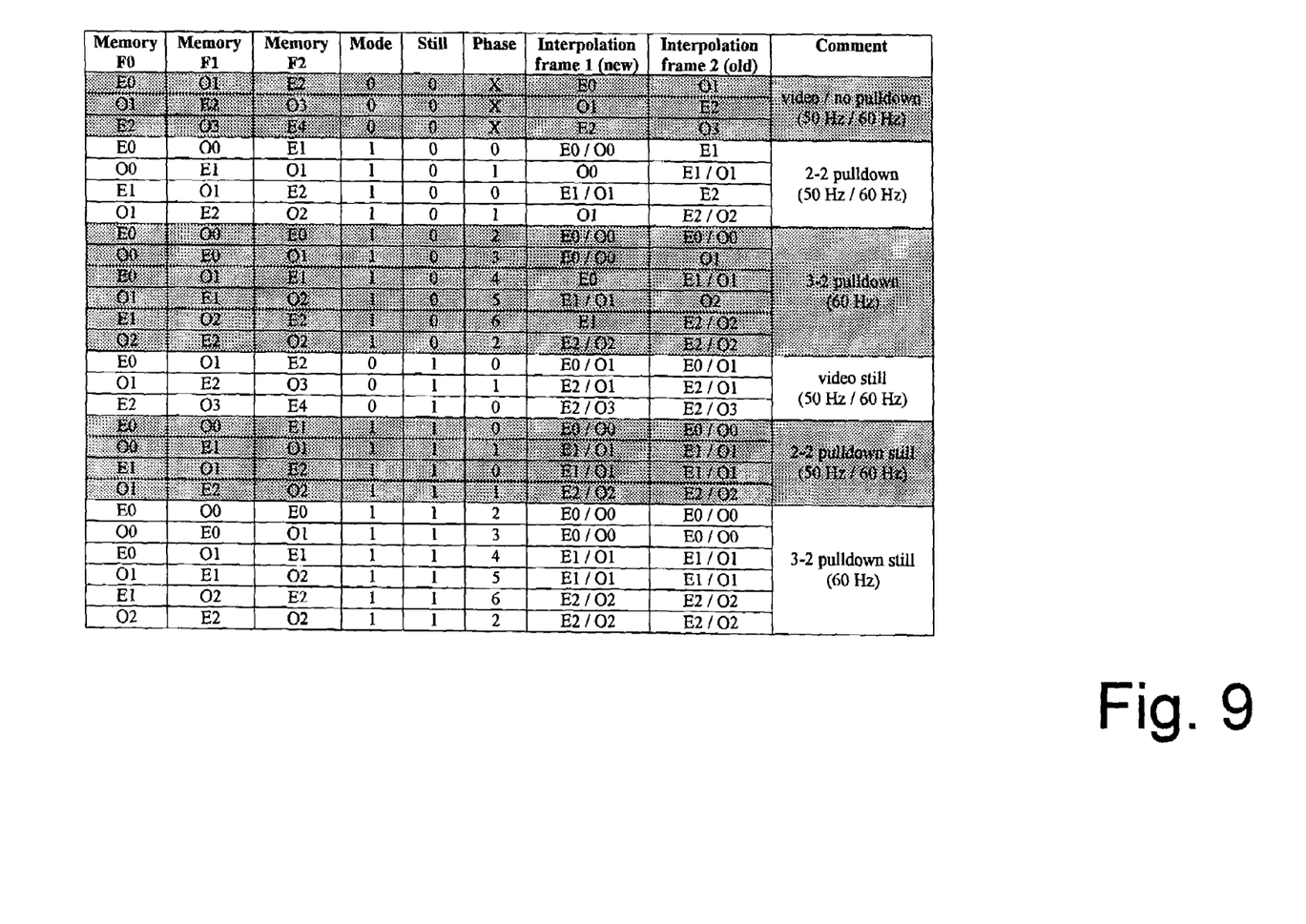
FIG. 9 lists different motion compensation processing schemes depending on the available status information on an image area basis.

The input signals are evaluated in accordance with the motion compensation processing indicated in the table of FIG. 9. Based on the processing indicated in FIG. 9, those image areas are merged by block line switch units 340, 350 stemming from the same motion phase. Thus, for video mode image areas, block line switch unit 340 selects image area F0 and block line switch unit 350 selects image area F1.

For film mode input image data, either block line switch unit 340 or block line switch 350 select and merge image data from two subsequent image areas, i.e. image areas F0 and F1, or image areas F1 and F2. The respective other block lines switch unit only forwards the data of the remaining image area. This processing is illustrated in FIGS. 10 and 11.

Figure 10:
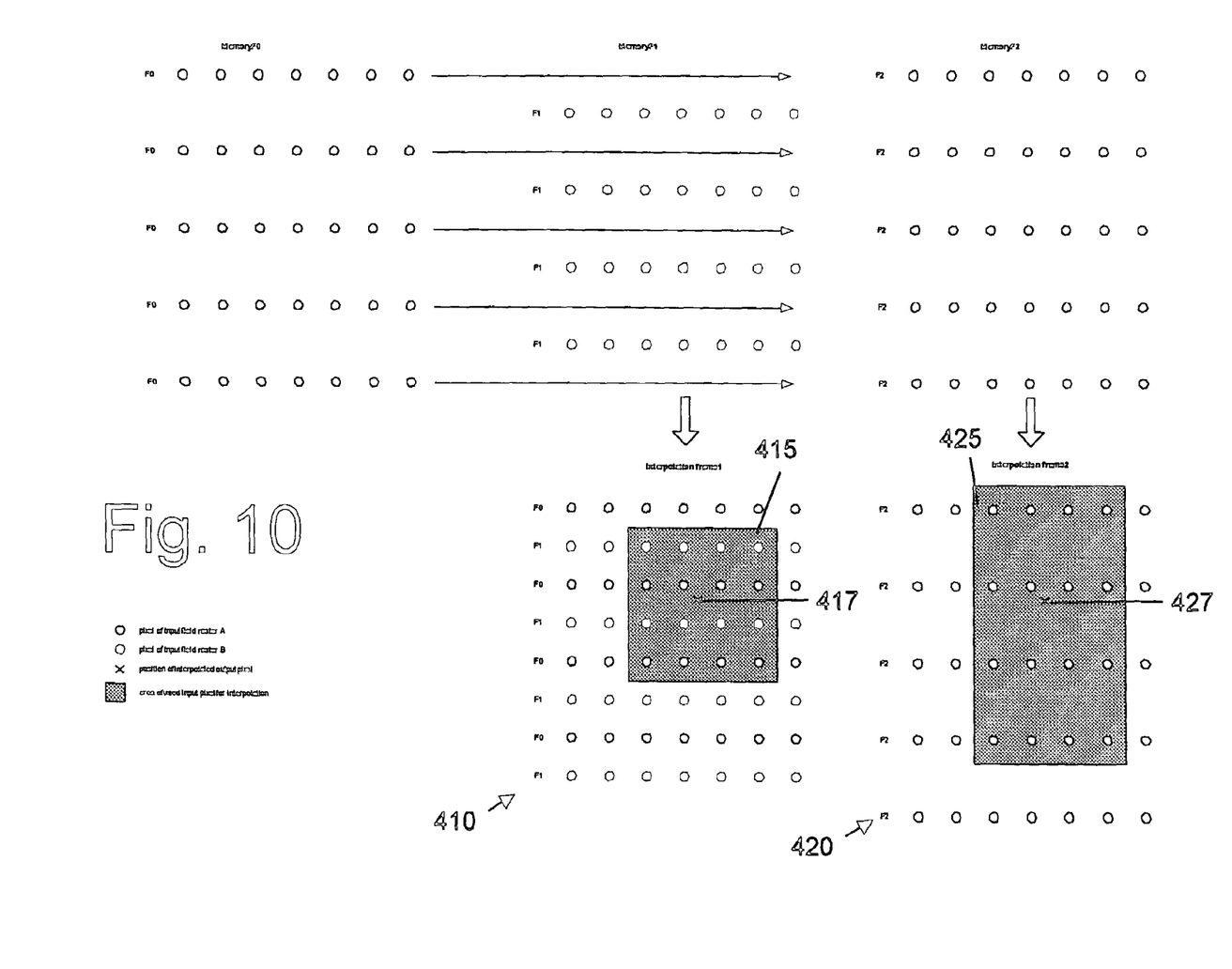
FIG. 10 illustrates an example for merging image areas stemming from different input fields in accordance with the present invention for film mode image areas.
Figure 11:
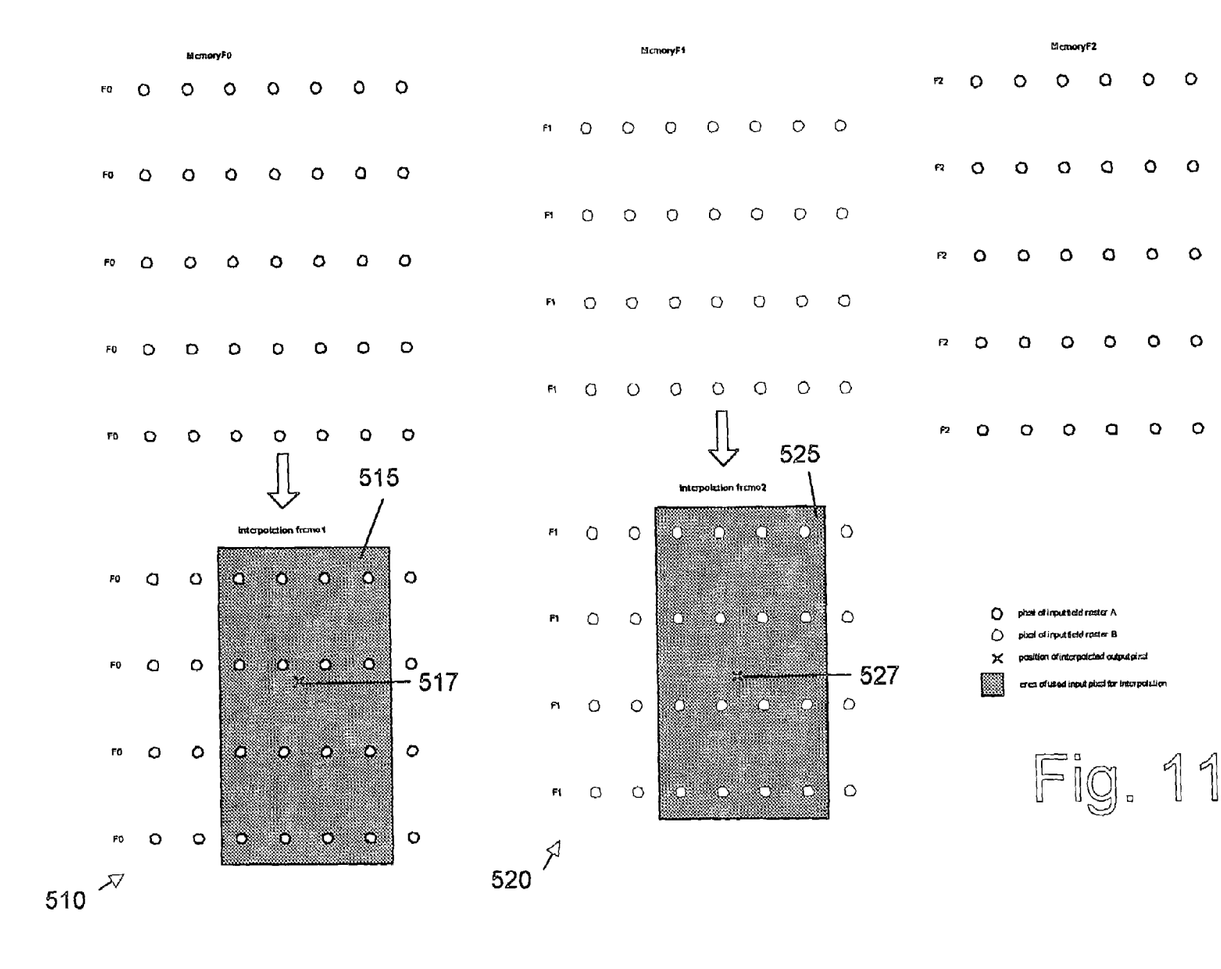
FIG. 11 illustrates a selection of image areas in accordance with the present invention for video mode image areas.

While FIG. 10 illustrates the merger of two image areas to process a total of three image areas for film mode, FIG. 11 illustrates the processing of two image areas for video mode. As can be seen from FIG. 10, the image data of fields F0 and F1 are merged into a single de-interlaced field 410. The additional image area F2 is forwarded unamended (420). Based on the image data of image areas 410, 420, the output image area is calculated by output filter unit 380.

The merger of input lines of image areas F0 and F1 is illustrated in FIG. 10. The status information determined for the current output image area to be calculated may be as follows:

| mode | still | phase |
|------|-------|-------|
| 1    | 0     | 0     |
| 1    | 0     | 3     |

For interpolation of field F2 in interpolation unit 370, no line merge is allowed as these image data belong to another motion phase indicated by the different phase signal.

In order to achieve an improved picture quality, in particular for calculating an output picture position not present in the input image areas, interpolation units 360, 370 are provided. These interpolation units 360, 370 select a number of pixels 415, 425 to be used for interpolation of an output pixel at pixel positions 417, 427. As the vertical resolution of the image areas 410, 420 differs for film mode image content and still mode image content, the vertical size of image areas 415, 425 is set differently in order to take the identical number of pixels for interpolation into account. In contrast, for video mode image areas, image portions 515, 525 for pixel interpolation are of identical size. Thus, interpolation units 360, 370 process image areas 510, 520 during video mode processing identically. The number of lines to be merged depends on the filter taps. In the example illustrated in FIGS. 10 and 11, a four-tap FIR filter combination (horizontal and vertical) is employed and marked by a reference numerals 415, 425, 515, 525.

It is a particular advantage of the present invention that different processing may be applied when generating the next image output block of the current image. For example, the local characteristics of the next output block may be described in the following control signal combination:

| mode | still | phase |
|------|-------|-------|
| 0    | 0     | X     |

The respective processing is illustrated in FIG. 11.

The skilled person is aware that the present invention is not limited to the storage and use of three memories for storing image data of three subsequent fields. In contrast, a further, fourth memory may be employed in order to fully recombine two film frames for interpolation.

Further, the definition of blocks is not limited to rectangular blocks, but every kind of image area may be employed having an arbitrary number of pixels and in irregular shape. Such irregular image areas might better suit respective image objects.

Summarizing, the present invention relates to a motion compensated image processing taking local characteristics of the image data into account. Image data included in a single image may stem from different video sources. In order to take the specific motion phase into account, the motion compensation processing is switched accordingly such that an improved picture quality can be achieved.

The invention claimed is:

1. A method for generating motion compensated output image data based on an interlaced input video sequence of subsequent fields, each field of the interlaced input video sequence comprises a plurality of blocks wherein a motion vector and status information are provided for each of the blocks, said method comprising:
   receiving a motion vector and status information for a current block of an output image to be generated, wherein the status information indicates a respective block to be in film mode or in video mode;
   obtaining input image data of the input video sequence based on the received motion vector and the received status information; and
   generating output image data for the current output block based on the obtained input image data.

2. The method according to claim 1 wherein the status information includes a motion phase indication for film mode blocks.

3. The method according to claim 1, wherein the status information indicates a respective block to be in still mode or motion mode.

4. The method according to claim 1, further comprising selecting blocks from the obtained image data stemming from two different motion phases.

5. The method according to claim 1, wherein the input image data is obtained from at least three subsequent fields when the received status information is film mode or still mode.

6. The method according to claim 5, further comprising interlacing the blocks stemming from two fields and representing a single motion phase into a progressive video format.

7. The method according to claim 6, further comprising selecting the blocks representing a single motion phase in accordance with a motion phase indication of the status information.

8. The method according to claim 5, further comprising interpolating the blocks stemming from a single motion phase.

9. The method according to claim 8, wherein an identical number of pixels of the single motion phase is interpolated for each of two motion phases when generating an output pixel.

10. The method according to claim 1, further comprising selecting two input blocks of subsequent fields for generating the output block if the received status information is video mode.

11. The method according to claim 1, wherein the received motion vector and the received status information are retrieved from the motion vector and status information at a corresponding position in a field, in temporal proximity of the output field to be generated.

12. A motion compensator for generating motion compensated output image data based on an interlaced input video sequence of subsequent fields, each field of said interlaced input video sequence comprises a plurality of blocks wherein a motion vector and status information are provided for each of said image blocks, said motion compensator comprising:
   an input memory for storing video data of blocks of said input video sequence in accordance with a motion vector and status information received for a current block of an output image to be generated, wherein said status information indicates a respective image area to be in film mode or in video mode; and
   an output interpolator for generating output image data from the video data.

13. The motion compensator according to claim 12, wherein said status information includes a motion phase indication for film mode blocks.

14. The motion compensator according to claim 12, wherein said status information indicates a respective block to be in still mode or motion mode.

15. The motion compensator according to claim 12, further comprising blockline switch units for selecting from said stored input blocks image data stemming from two different motion phases.

16. The motion compensator according to claim 12, wherein said input image memory stores blocks of at least three subsequent fields.

17. The motion compensator according to claim 15, wherein one of said blockline switch units combines blocks stemming from two fields and representing a single motion phase, for de-interlacing the blocks into a progressive video format.

18. The motion compensator according to claim 17, wherein said one blockline switch unit selects said blocks representing a single motion phase in accordance with a motion phase indication of said status information.

19. The motion compensator according to claim 15, further comprising an interpolation unit for interpolating the image data output by said blockline switch units.

20. The motion compensator according to claim 19, wherein said interpolation unit interpolates an identical number of pixels of the output image data of said blockline switch units.

21. The motion compensator according to claim 12, comprising two block line switch units, each of which selects input image data of a single input block if said received status information is video mode.

22. The motion compensator according to claim 12, wherein said received motion vector and said received status information are retrieved from said motion vector and status information at a corresponding position in a field in temporal proximity to the output image to be generated.

* * * * *